United States Patent [19]

Akiyoshi

[11] Patent Number: 5,106,178
[45] Date of Patent: Apr. 21, 1992

[54] PRESCRIPTION LENS HOLDER FOR USE WITH SUNGLASSES

[76] Inventor: Minoru Akiyoshi, 817 Oak Ave., Davis, Calif. 95616

[21] Appl. No.: 627,768

[22] Filed: Dec. 14, 1990

Related U.S. Application Data

[63] Continuation-in-part of Ser. No. 527,835, Mar. 24, 1990, Pat. No. 5,056,906.

[51] Int. Cl.$^5$ .............................................. G02C 7/08
[52] U.S. Cl. ........................................ 351/57; 351/47
[58] Field of Search ................ 351/44, 47, 57, 59; 2/444, 445

[56] References Cited

U.S. PATENT DOCUMENTS

| | | |
|---|---|---|
| D. 203,949 | 3/1966 | Dym . |
| 1,130,634 | 3/1915 | Rooney . |
| 1,561,958 | 11/1925 | Tully . |
| 1,587,131 | 6/1926 | Tillyer . |
| 1,923,567 | 8/1933 | Baker . |
| 2,951,418 | 9/1960 | Bitner et al. . |
| 3,427,098 | 2/1969 | Johnston . |
| 3,890,237 | 6/1975 | Zingareth . |
| 4,070,103 | 1/1978 | Meeker . |
| 4,338,004 | 7/1982 | Vosper . |
| 5,056,906 | 10/1991 | Akiyoshi .............................. 351/57 |

*Primary Examiner*—Paul M. Dzierzynski
*Attorney, Agent, or Firm*—Thomas R. Lampe

[57] ABSTRACT

Prescription lenses are detachably applied to sunglasses by securing the lenses between prescription lens holder elements of a prescription lens holder and attaching the prescription lens holder to the sunglass frame. Projections are attached to the sunglass frame, each defining two spaced indents at opposed ends for receiving a portion of the prescription lens holder elements.

11 Claims, 2 Drawing Sheets

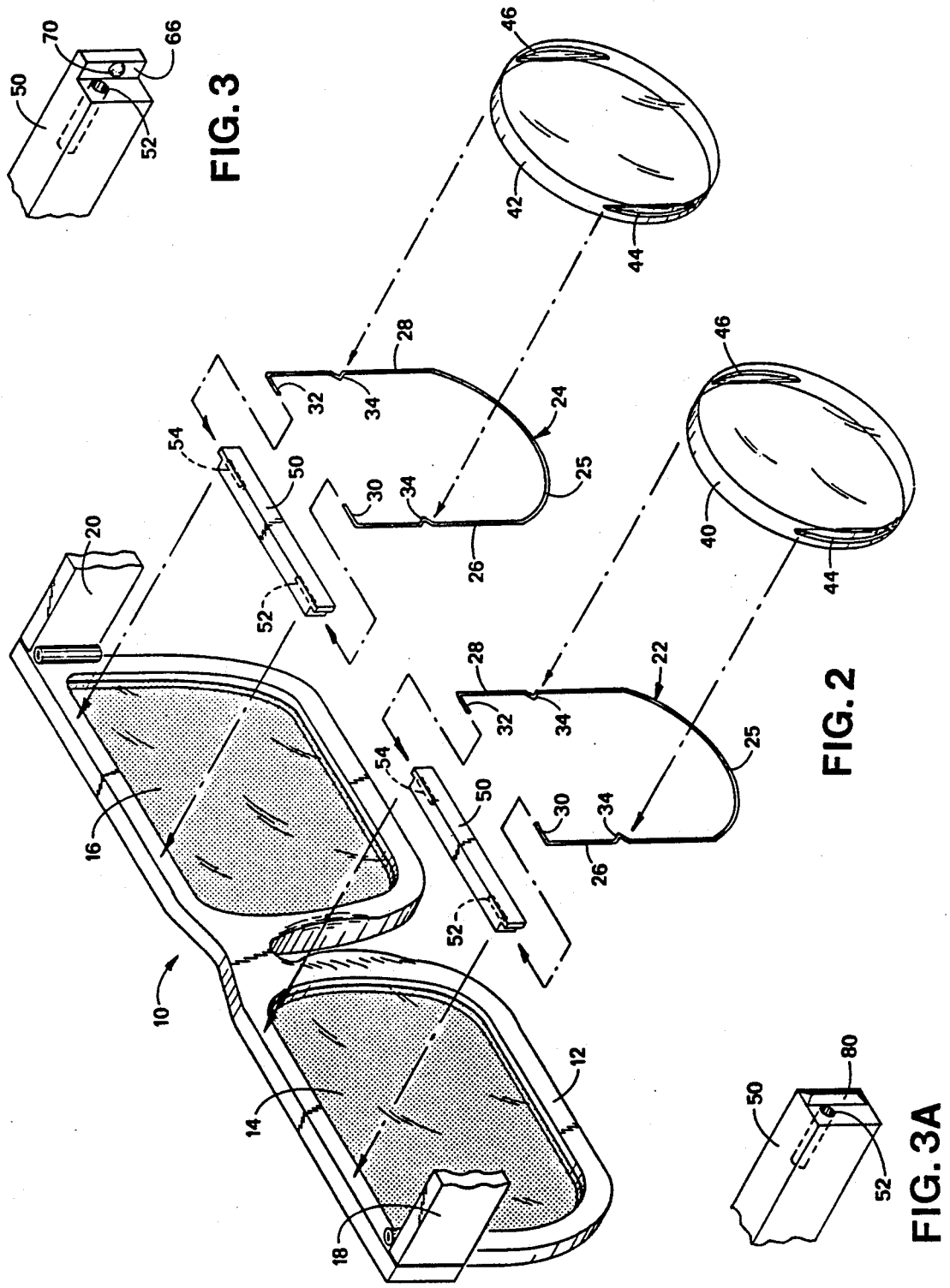

PRESCRIPTION LENS HOLDER FOR USE WITH SUNGLASSES

This application is a continuation-in-part of copending U.S. Patent Application Ser. No. 07/527,835 now U.S. Pat. No. 5,056,906, filed Mar. 24, 1990.

TECHNICAL FIELD

The present invention relates to an arrangement whereby conventional non-prescription sunglasses may be retrofitted and employed in association with prescription lenses. The apparatus includes a prescription lens holder, a prescription lens positioned in the holder, and attachment means permitting manual selective attachment and detachment of the prescription lens holder and lens with respect to the sunglass frame.

BACKGROUND ART

U.S. Pat. No. 1,923,567 discloses an ophthalmic mounting arrangement which allows individual prescription lenses to be selectively applied to goggles. Each prescription lens is separately manually positioned in or removed from clips which comprise part of the goggles. Since the prescription lenses must be handled directly during application or removal there is considerable likelihood that they will be damaged. Furthermore, the means for mounting the individual prescription lenses is an integral part of the goggle construction, considerably adding to goggle cost and complexity. There is no showing in U.S. Pat. No. 1,923,567 of an approach whereby prescription lenses may be readily applied to and removed from conventional sunglasses. U.S. Pat. Nos. 1,561,958 and 1,587,131 have similar deficiencies.

Applicant is also aware of prior art arrangements which purportedly convert spectacles or eyeglasses into a pair of sunglasses. This, of course, is quite opposed to the present arrangement which allows for the ready application of prescription lenses to sunglasses. In any event, U.S. Pat. No. 3,890,037 discloses an arrangement allowing for the attachment of tinted flexible plastic lenses to a pair of spectacles. More particularly, the lenses are individually press fit into the rear face of a spectacle frame. Such an arrangement requires individual manual handling of the tinted lenses and the spectacle frames must be machined in a highly precise manner to permit application of the tinted lenses. This, of course, greatly adds to cost. U.S. Pat. No. 3,427,098 also relates to a sun shade attachment for eyeglasses and the device disclosed therein suffers from the same deficiencies as the device shown in U.S. Pat. No. 3,890,037. Yet another arrangement of this same general type is disclosed in U.S. Pat. No. 4,338,004.

U.S. Pat. No. 4,070,103 discloses the use of lens rim covers which may come in a variety of sizes, shapes, and designs and which may be selectively attached to or removed from a conventional spectacle frame to provide different appearances.

Of even less pertinence to the present invention are the arrangements shown in U.S. Pat. No. 1,130,634 disclosing an arrangement for attaching a shield to spectacles, U.S. Pat. No. 2,951,418 disclosing a complex corrective lens holder for a face mask, and U.S. Design Pat. No. 203,949 disclosing a safety lens attachment design for eyeglasses.

In contrast to the arrangements disclosed in the above-identified patents, the apparatus disclosed in my co-pending U.S. Patent Application Ser. No. 07/527,835, filed Mar. 24, 1990, allows prescription lenses to be attached to or removed from sunglasses without the user having to directly touch the prescription lenses and possibly cause damage thereto.

The apparatus disclosed herein provides the same advantage. Also in common with the apparatus of the aforesaid co-pending application, the present apparatus is simple, light-weight and low cost. Utilizing the approach of the present invention, prescription lenses may be employed in conjunction with a wide variety of sunglass styles, including popular designer styles.

DISCLOSURE OF INVENTION

Apparatus constructed in accordance with the teachings of the present invention includes sunglasses having a sunglass frame and tinted sunglass elements connected to the frame.

The apparatus includes a prescription lens holder including a pair of prescription lens holder elements, the prescription lens holder elements being spaced from one another and disposed in a common plane.

A prescription lens is disposed between the prescription lens holder elements and securement means is provided for securing the prescription lens in fixed position between the prescription lens holder elements.

Attachment means is provided for attaching the prescription lens holder to the sunglass frame whereby the prescription lens is disposed behind a tinted sunglass element. The attachment means comprises a projection affixed to the sunglass frame and defining two spaced indents at opposed ends of the projection. Each indent receives a portion of one of the prescription lens holder elements.

More specifically, the sunglass frame and the projection define a pair of notches, with each of the notches being in communication with one of the indents and accommodating a prescription lens holder element therein when the prescription lens holder element portions are received by the indents.

The prescription lens defines opposed grooves in the outer peripheral surface thereof and the prescription lens holder elements include elongated retention members positionable in the grooves. The prescription lens holder element portions are integral with and bent relative to the elongated retention members to form distal ends located in the indents.

The projection defines bearing surfaces at the opposed ends thereof, the bearing surfaces and the elongated retention members being in engagement when the distal ends are located in the indents to continuously urge the elongated retention members and the prescription lens toward a tinted sun glass element.

Other features, advantages, and objects of the present invention will become apparent with reference to the following detailed description and accompanying drawings.

BRIEF DESCRIPTION OF DRAWINGS

FIG. 2 is a view similar to FIG. 1, but illustrating the structural components of the apparatus in exploded format;

FIG. 3 is an enlarged, perspective view illustrating details of a selected component of the apparatus; and FIG. 3A is a view similar to FIG. 3 but illustrating an alternative embodiment.

BEST MODE FOR CARRYING OUT THE INVENTION

Figure 1:
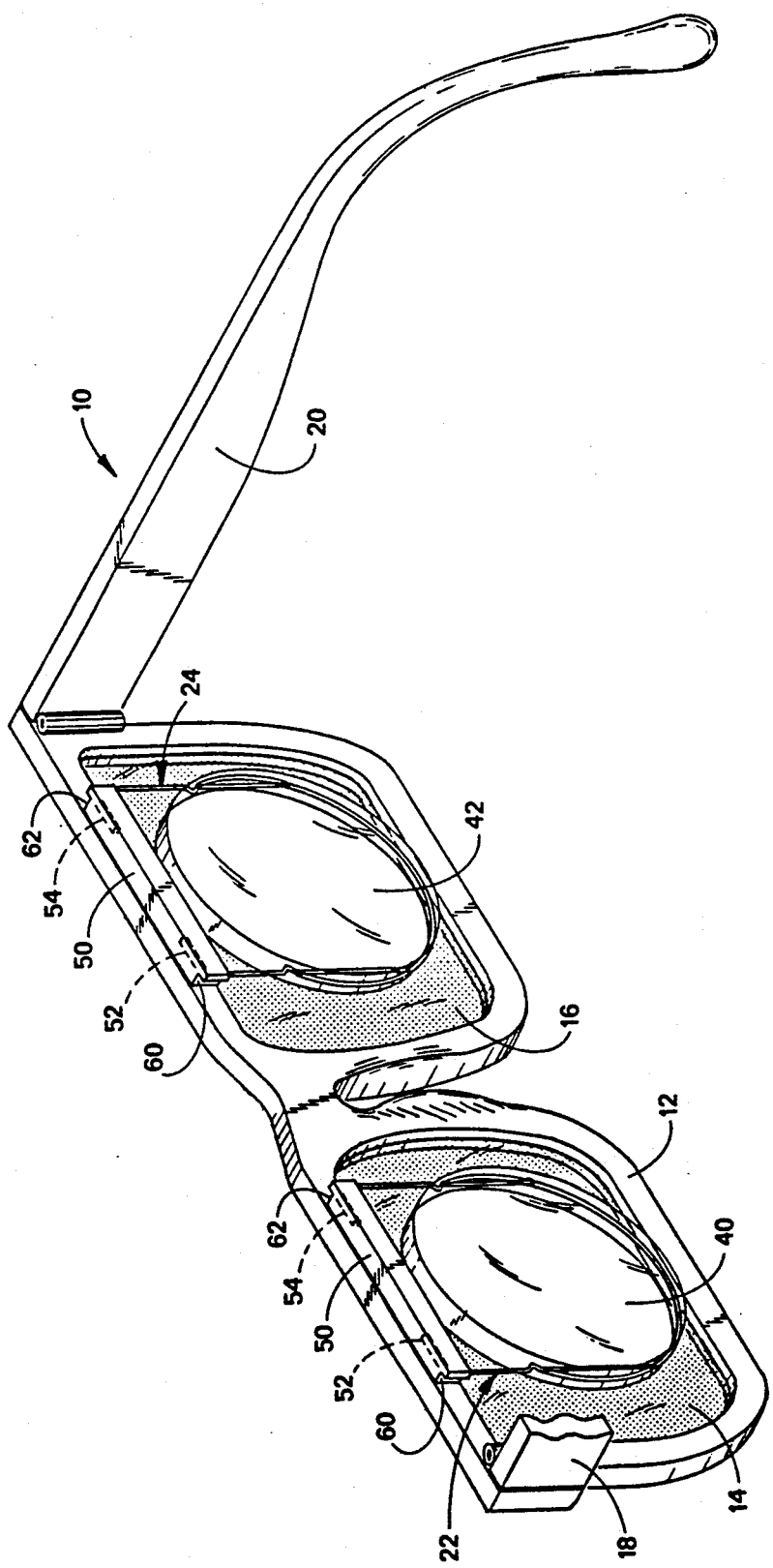
FIG. 1 is a perspective view of a preferred form of apparatus constructed in accordance with the teachings of the present invention, with a portion thereof broken away for clarity.

Referring now to the drawings, sunglasses are generally designated by reference numeral 10. As is conventional, sunglasses 10 include a sunglass frame 12 and tinted sunglass elements 14, 16 disposed within the frame. Also as is conventional, the sunglasses 10 include a pair of earpieces 18, 20 pivotally connected to the frame by hinges. In FIG. 1 ear piece 18 is shown broken away, and in FIG. 2 both ear pieces 18, 20 are shown broken away, for the purpose of facilitating disclosure.

Two prescription lens holders 22, 24 are shown in FIG. 1 attached to the sunglasses. Prescription lens holders 22, 24 are discrete and separate. The construction of the prescription lens holders is identical. Each lens holder has a generally U-shaped configuration including a curved bottom segment 25 generally corresponding to the peripheral shape of a prescription lens and two prescription lens holder elements including elongated retention members 26, 28 projecting upwardly from the curved bottom segment as shown. Each prescription lens holder is of unitary construction and formed of relatively thin-gauge wire. The lens holders may be fabricated utilizing conventional wire forming techniques.

Each prescription lens holder includes a pair of prescription lens holder element portions 30, 32 integral with the elongated retention members and bent inwardly relative thereto to form distal ends. An inwardly projecting bight segment 34 is formed in each of the elongated retention members at a location below the portions 30, 32.

Each prescription lens holder 22, 24 is for the purpose of retaining therein prescription lenses 40, 42 in the manner illustrated in FIG. 1. More specifically, it is to be noted that each of the prescription lenses has opposed grooves 44, 46 formed in the outer peripheral surface thereof. The elongated retention members 26, 28 of each prescription lens holder are positionable in the grooves 44, 46 between the curved bottom segment 25 of each prescription lens holder and the bight segments 34 thereof. This will maintain the proper orientation of the prescription lens relative to its associated prescription lens holder.

Secured to the sunglasses frame 12 over each sunglass element thereof is an elongated projection 50 which may be formed of any suitable material such as plastic. Any suitable means, such as adhesive, may be employed to affix the projections to the frame. Alternatively, the projections may be integrally formed with the frame. In any event, each projection has an elongated configuration generally equal in length to the distance between elongated retention members 26, 28 of the prescription lens holders.

Spaced indents or holes 52, 54 are formed in opposed ends of each projection 50. These indents receive therein, as shown in FIG. 1, the generally horizontally disposed lens holder element portions 30, 32. When the lens holder element portions 30, 32 are in the indents the prescription lenses 40, 42 are disposed behind sunglass elements 14, 16 and in registry with an area of the sunglass elements.

The opposed ends of each projection 50 are notched out, as illustrated, whereby each projection and the sunglass frame define a pair of notches 60, 62. Each of the notches is in communication with one of the indents and accommodates therein an elongated retention member when portions 30, 32 are disposed in the indents.

Each projection 50 has a bearing surface 66 (see FIG. 3) which prevents the elongated retention members from swinging outwardly relative to the sunglass elements. Preferably, a detent 70 is located on each bearing surface, projecting therefrom to engage the elongated retention members 26, 28 to prevent lens holder element portions 30, 32 from withdrawing from indents 52, 54. Thus, the prescription lens holders are locked into place relative to the sunglasses unless manually manipulated and removed therefrom. This locking feature also ensures that the prescription lenses 40, 42 will be retained within their respective prescription lens holders.

FIG. 3A illustrates an alternative embodiment of projection 50 wherein the bearing surface 80 has two interconnecting slopes forming an apex. With this embodiment the lens holders may be manually pivoted away from the prescription lenses to permit cleaning of the sunglass elements.

We claim:

1. Apparatus comprising, in combination:
   sunglasses including a sunglass frame and tinted sunglass elements connected to said frame;
   a prescription lens holder including a pair of prescription lens holder elements, said prescription lens holder elements being spaced from each other and disposed in a common plane;
   a prescription lens disposed between the prescription lens holder elements;
   securement means for securing said prescription lens in fixed position between said prescription lens holder elements; and
   attachment means for attaching said prescription lens holder to said sunglass frame whereby said prescription lens is disposed behind a tinted sunglass element, said attachment means comprising a projection affixed to said sunglass frame and defining two spaced indents at opposed ends of said projection, each said indent receiving a portion of one of said prescription lens holder elements.

2. The apparatus according to claim 1 wherein said sunglass frame and said projection define a pair of notches, each of said notches being in communication with one of said indents and accommodating a prescription lens holder element therein when said prescription lens holder element portions are received by said indents.

3. The apparatus according to claim 2 wherein said prescription lens has opposed grooves formed in the outer peripheral surface thereof, said prescription lens holder elements including elongated retention members positionable in said grooves, said grooves and said elongated retention members at least partially comprising said securement means, said prescription lens holder element portions being integral with, and bent relative to, said elongated retention members to form distal ends located in said indents.

4. The apparatus according to claim 3 wherein said prescription lens holder comprises a wire framework of lightweight, unitary construction.

5. The apparatus according to claim 3 wherein said projection defines bearing surfaces at said opposed ends thereof, said bearing surfaces and said elongated retention members being in engagement when said distal ends are located in said indents to continuously urge said elongated retention members and the prescription lens toward a tinted sunglass element.

6. The apparatus according to claim 5 additionally comprising retention means for retaining the distal ends in said indents.

7. The apparatus according to claim 6 wherein said retention means comprises projections on said bearing surfaces engageable by said elongated retention members.

8. The apparatus according to claim 1 wherein a separate and discrete prescription lens holder is operatively associated with each sunglass element.

9. The apparatus according to claim 3 wherein each of said elongated retention members is formed of wire and defines at least one bight segment engageable with the outer periphery of a prescription lens adjacent to one of said grooves to maintain said prescription lens in fixed position relative to said elongated retention members.

10. The apparatus according to claim 9 wherein said elongated retention members bear against a substantially straight prescription lens surface within said grooves to prevent rotation of said prescription lens.

11. The apparatus according to claim 9 wherein said prescription lens holder has a curved bottom segment spaced from said bight segment, said curved bottom segment and said at least one bight segment disposed at opposite ends of a prescription lens groove and cooperable to retain said prescription lens in said prescription lens holder.

* * * * *